United States Patent
Schalles

[11] 3,798,721
[45] Mar. 26, 1974

[54] INDEXIBLE TOOL TURRET ASSEMBLY

[75] Inventor: Erhard Schalles, Obbedissen, Germany

[73] Assignee: Werkzeugmaschinenfabrik Gildemeister & Comp. Aktiengesellschaft, Bielefeld, Germany

[22] Filed: June 9, 1972

[21] Appl. No.: 263,364

[30] Foreign Application Priority Data
June 9, 1971 Germany.............................. 2128642

[52] U.S. Cl..................................... 29/42, 82/36 A
[51] Int. Cl......................... B23b 3/16, B23b 29/00
[58] Field of Search............. 29/42, 43, 54; 82/36 A

[56] References Cited
UNITED STATES PATENTS

| 571,402 | 11/1896 | Schneider | 82/36 A X |
|---|---|---|---|
| 556,415 | 3/1896 | Hartness | 82/36 A |
| 2,534,333 | 12/1950 | Wyrick | 82/36 A X |
| 946,924 | 1/1910 | Thompson | 82/36 A X |
| 3,287,792 | 11/1966 | Kummer | 29/54 |
| 2,389,019 | 11/1945 | Bazley et al. | 29/42 |
| 2,422,071 | 6/1947 | Betzen | 29/42 |

Primary Examiner—Harrison L. Hinson
Attorney, Agent, or Firm—Michael S. Striker

[57] ABSTRACT

A tool turret assembly which has a larger-diameter turret with an annulus of axially parallel holders for boring tools and a smaller-diameter turret having an annulus of holders for turning tools. The larger-diameter turret is rotatably and axially movably mounted on an axially movable shaft which is rigid with the smaller-diameter turret and carries the rotor of a hydraulic motor. The larger-diameter turret can be moved axially to be non-rotatably coupled to a stationary housing, and at least one of the turrets is movable axially toward the other turret to thereby connect the larger-diameter turret to the shaft for indexing by the hydraulic motor. Two tool holders of the larger-diameter turret define a recess which allows for the placing of a selected turning tool into a material-removing position relative to a workpiece which is rotated by a work spindle during turning. The shaft and the larger-diameter turret are movable axially by multi-stage pistons. The couplings, connecting the turrets to another and the one turret with the housing, allow the indexing of the turrets in different fixed working positions.

8 Claims, 4 Drawing Figures

INDEXIBLE TOOL TURRET ASSEMBLY

BACKGROUND OF THE INVENTION

The present invention relates to machine tools in general, and more particularly to improvements in tool turret assemblies for use in machine tools. Still more particularly, the invention relates to improvements in tool turret assemblies of the type wherein selected tools are preferably movable to material-removing positions bu automatic indexing means.

It is already known to provide a tool turret with axially parallel holders for boring, turning and like tools. A drawback of presently known tool turrets is that the tool holders form a single annulus so that the swing diameter of the rotary workpiece (i.e., the maximum diameter of the space wherein the workpiece is rotated by a spindle or the like during removal of material by a selected tool) is limited by the distance between the selected material removing tool and the two nearest tools. The maximum swing diameter of the workpiece depends on the diameter of the circle formed by the axes of tool holders on the indexible turret, on the number of toold holders, and also on the diameters of boring or like tools which are inserted into their holders. Consequently, if the swing diameter of the workpiece is large, the number of tool holders must be reduced or the diameter pf the turret must be increased so as to allow the placing of tool holders at a greater distance from each other. As a rule, it is necessary to reduce the number of tool holders because the diameter of the turret cannot be increased at will. A reduction in the number of tool holders is undesirable because it affects the versatility of the machine tool.

SUMMARY OF THE INVENTION

An object of the invention is to provide a novel and improved tool turret assembly which can carry a large number of tool holders without unduly increasing its diameter and without necessitating a reduction in the swing diameter of the workpiece.

Another object of the invention is to provide a tool turret assembly which can be mounted on a slide in a machine tool and is capable of bypassing a headstock, one or more steady rests and/or one or more slides in a lathe or the like.

A further object of the invention is to provide novel and improved indexing means for the tool holders of the improved tool turret assembly.

An additional object of the invention is to provide a tool turret assembly which can support nearly twice as many tool holders as a conventional tool turret of identical diameter.

The improved tool turret assembly comprises coaxial first and second tool turrets each having an annulus of tool holders, and indexing means for rotating the turrets together with or independently of each other. The tool holders of one of the turrets preferably support axially parallel boring or the like tools, and the tool holders of the other turret preferably support an annulus of axially parallel turning tools. The axes of tool holders on the one turret form a circle whose center is located on the common axis of the tool turrets and whose diameter exceeds the maximum diameter of the circle formed by the tools on the other turret so that the tools supported by the other turret can be indexed independently of tools on the one turret.

The novel features which are considered as characteristic of the invention are set forth in particular in the appended claims. The improved tool turret assembly itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
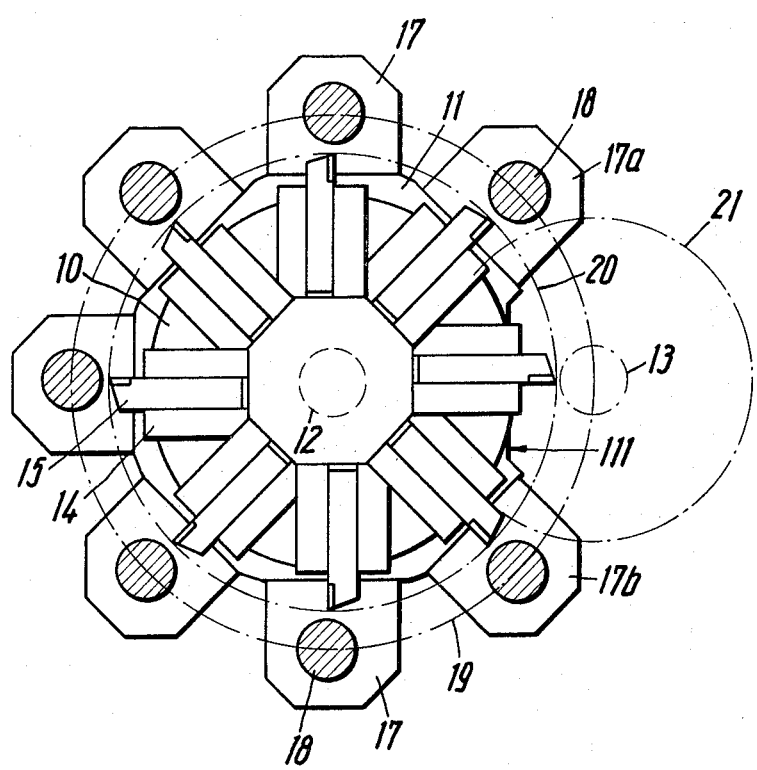
FIG. 1 is a diagrammatic front elevational view of the improved tool turret assembly.
Figure 2:
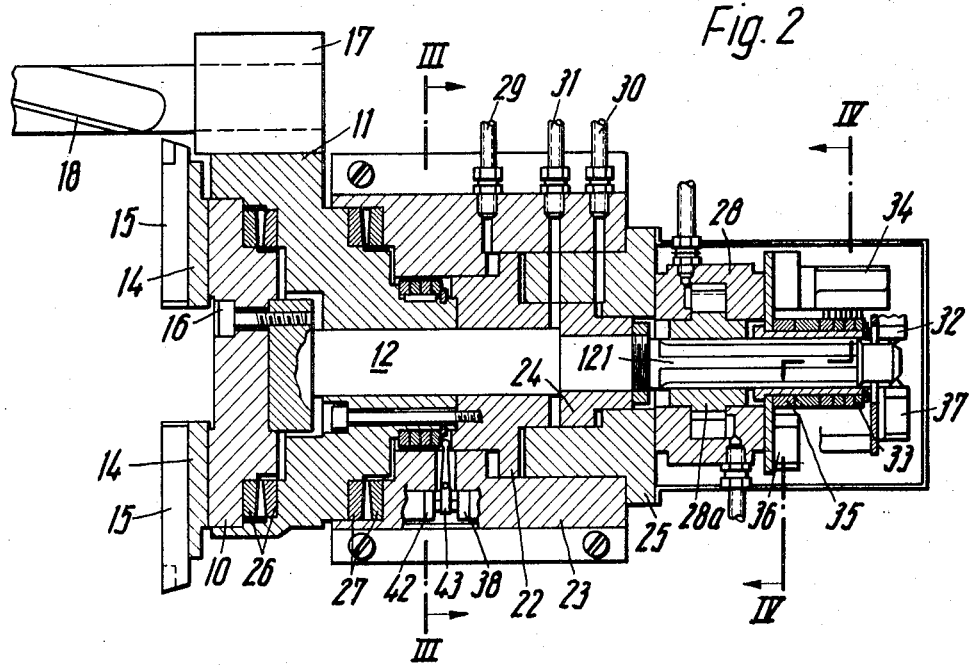
FIG. 2 is an axial sectional view of the tool turret assembly.

Referring first to FIGS. 1 and 2, there is shown a tool turret assembly which is mounted on a slide in a lathe or another machine tool and comprises two coaxial turrets 10 and 11. The smaller-diameter turret 10 is secured to the front end portion of an indexing shaft 12 by one or more screws 16 or analogous fasteners and is movable with the shaft axially relative to a housing 23 which is mounted on the tool slide. The axis of the shaft 12 is parallel to the axis of a rotary work spindle 13. The maximum swing circle of a workpiece which is rotated by the spindle 13 is shown at 21.

The front end face of the smaller-diameter turret 10 carries an annulus radially extending axially parallel quick-change holders 14 for turning tools 15. In the illustrated embodiment, the turret 10 supports eight equdistant tool holders 14.

The larger-diameter turret 11 is rotatable on and movable within limits axially of the shaft 12 for the turret 10. The periphery of the turret 11 is provided with an annulus of holders 17 for boring or analogous tools 18 each of which is parallel with the axis of the shaft 12. The axes of the tools 18 form a circle 19 whose center is located on the axis of the shaft 10 and whose diameter exceeds the diameter of a circle 20 formed by the radially outermost portions of turning tools 15 in the holders 14 of the turret 10. Consequently, the turret 10 can be indexed relative to the turret 11.

As shown in FIG. 1, the turret 11 carries seven tool holders 17 and the holders 17a, 17b define a recess or gap 111 bounded by a concave surface of the turret 11. The distance between the tool holders 17a, 17b is twice the average distance between the tool holders of the turret 11, i.e., the recess 111 is dimensioned in such a way that a selected tool 15 can remove material from a workpiece having a swing diameter as large as that of the circle 21 shown in FIG. 1. When the machine tool is to carry our a turning operation, the larger diameter turret 11 is indexed to the position shown in FIG. 1 in which the recess 111 is adjacent to the work spindle 13, and the turret 10 is indexed to place a selected tool 15 into the material removing position. The slide which supports the improved tool turret assembly is then moved toward the axis of the work spindle 13 so that the selected tool 15 removes material from the rotating workpiece. As mentioned above, the provision of the recess 111 in the turret 11 renders it possible to treat in the machine tool workpieces having a very large swing circle 21 and to mount on the turret assembly a large number of tools without unduly increasing the diameter of the tool assembly.

The means for moving the turret 11 axially includes a multi-stage piston 22 which is bolted to the turret 11 and is reciprocable in a suitably configured cylinder chamber of the housing 23. The piston 22 has an axial bor for the shaft 12 which is rigid with the turret 10. The means for moving the shaft 12 and the turret 10 axially comprises a second multi-stage piston 24 which is mounted on the shaft 12 behind the piston 22 and is reciprocable in a cylinder chamber of a cover member 25 secured to or forming part of the housing 23.

The tool turret assembly further comprises coupling means 26 for connecting the turret 11 to the turret 10 so that the turret 11 can be indexed by the shaft 12. The coupling means 26 comprises two ring gears one of which is provided on a rear end face of the turret 10 and the other of which is provided on a front end face of the turret 11. A second coupling 27 is provided between the turret 11 and the housing 23 and serves to hold the turret 11 against the rotation in a selected angular position of the turret 11 or during independent indexing of the turret 10. The coupling 27 also comprises first and second ring gears which are respectively provided on a rear end face of the turret 11 and a front end face of the housing 23.

The housing 23 is connected with three conduits 29, 30 and 31 for admission and evacuation of operating fluid from the chambers for the pistons 22 and 24. The indexing means for the turrets 10, 11 further comprises a hydraulic motor 28 having a rotor 28a which is secured to or made integral with the rear portion of the shaft 12 behind the cover member 25. In the illustrated embodiment, the rear portion of the shaft 12 is splined, as at 121, so that it is compelled to rotate with but can move axially of the rotor 28a.

Figure 4:
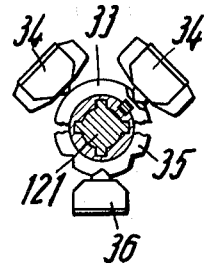
FIG. 4 is a transverse sectional view as seen in the direction of arrows from the line IV—IV of FIG. 2.

The operation:

If it is desired to index the turret 10, the system of valves which control the admission and evacuation of fluid by way of the conduits 29, 30 and 31 connects the conduits 29, 30 with a source of pressurized fluid while the conduits 31 is free to discharge fluid from the corresponding portion of the chamber for the piston 24. The pressurized fluid which is admitted by way of the conduit 29 causes the piston 22 to move in a direction to the right, as viewed in FIG. 1, so that the coupling 27 connects the turret 11 to the housing 23. The pressurized fluid which is admitted by way of the conduit 30 causes the piston 24 (and hence the shaft 12 with the turret 10) to move in a direction to the left, as viewed in FIG. 2, so that the coupling 26 is disengaged and the turret 10 is free to rotate relative to the turret 10. The completion of leftward axial movement of the shaft 12 and turret 10 to the extent which is necessary to disengage the coupling 26 results in actuation of a switch 32 (e.g., by means of a suitable trip on the shaft 12) whereby the switch 32 starts the hydraulic motor 28 of the indexing means so that the rotor 28a changes the angular position of the shaft 12. The shaft 12 and turret 10 can be arrested in a preselected angular position by a device including a disk-shaped cam 33 secured to the splined rear portion 121 of the shaft 12 and a set of switches 34 which are adjacent to the path of the cam 33. When the cam 33 actuates a selected switch 34, the latter reduces the speed of the motor 28 by effecting a throttling the flow of oil or another suitable fluid medium to the motor 28. The motor 28 is brought to a full stop by a second disk-shaped cam 35 which is also mounted on the shaft portion 121 and is movable relative to an arresting switch 36 shown in FIG. 4. The switch 36 insures that the motor 28 is arrested at the exact moment when the selected tool 15 is moved to an optimum position for removal of material from the workpiece on the work spindle 13. In the next step, the system of valves admits a pressurized fluid by way of the conduit 31 and allows escape of fluid by way of the conduit 30 so that the piston 24 moves the shaft 12 rearwardly in order to engage the coupling 26 which thereby holds the turret 10 against the movement from the selected angular position. The coupling 26 then connects the turret 10 to the turret 11 which is connected to the housing 23 by the coupling 27. The termination of rightward axial movement of the shaft 12 (i.e., the engagement of the coupling 29) is directed by a switch 37 which is actuated by the right-hand end portion of the shaft 12 and transmits a signal to the programming means of the machine tool.

Figure 3:
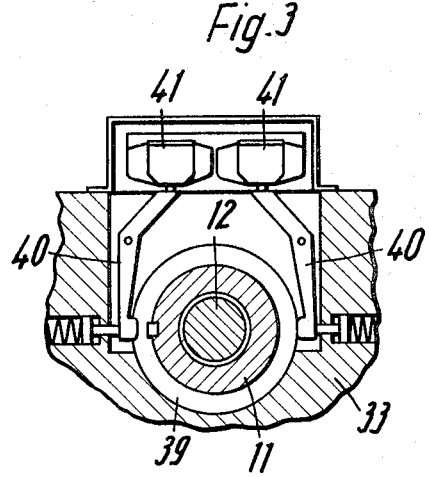
FIG. 3 is a transverse sectional view as seen in the direction of arrows from the line III—III of FIG. 2.

If the turrets 10 and 11 are to be indexed as a unit, the system of valves admits a pressurized fluid by way of the conduits 30 and 31 while the conduit 29 is free to permit evacuation of fluid from the left-hand protion of the cylinder chamber for the piston 22. The piston 22 moves in a direction to the left, as viewed in FIG. 2, so that the coupling 27 is disengaged and the turret 11 is free to rotate relative to the housing 23. At the same time, the coupling 26 remains engaged to thus continue to connect the turret 11 to the turret 10 for rotation with the shaft 12. The turret 11 is connected with a lever 43 shown in FIG. 2 which actuates a switch 38 when the coupling 27 is disengaged whereby the switch 38 starts the motor 28 which indexes the turrets 10 and 11 by way of the shaft 12. The turret 11 carries a disk-shaped cam 39 (FIG. 3) which is tracked by two spring-biased levers 40. Each lever 40 is operatively associated with a multi-way control switch 41 one of which begins to throttle the flow of pressurized fluid to the motor 28 when the respective lever 40 enters a notch in the periphery of the cam 39. The motor 28 then rotates the shaft 12 at a reduced speed and is arrested by the aforementioned switch 36 in a preselected angular position of the turret 10 and 11. At the same time, the switch 36 adjusts the system of valves so that the conduit 30 is free to evacuate fluid and the conduits 29, 31 admit pressurized fluid into the respective cylinder chambers. This causes the coupling 27 to connect the turret 11 to the housing 23. At the same time, the lever 43 on the turret 11 actuates a switch 42 (shown in FIG. 2) which transmits an appropriate signal to the programming means of the machine tool.

An important advantage of the improved tool turret assembly is that it can carry twice as many tool holders as a conventional tool turret of identical or similar diameter. Alsom the tool turret assembly renders it possible to increase the diameter of the swing circle 21 for the workpiece on the spindle 13. This is achieved by providing the turret assembly with several discrete turrets which are indexible with and relative to each other. In the illustrated embodiment, the turret 11 will be indexed to move a selected tool holder 17 to its operative position or to move the recess 111 to the position of FIG. 1 so as to allow for unimpeded treatment of the workpiece by a selected tool 15.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

I claim:

1. A tool turret assembly comprising coaxial first and second turrets each having an annulus of tool holders, the tool holders of one of said turrets including means for supporting boring tools in parallelism with the common axis of said turret and the tool holders of the other turret including means for supporting turning tools extending transverse to said axis, the axes of said tool holders on said one turret being located on a circle having its center on said common axis of said turrets and a diameter exceeding the maximum diameter of said other turret; and indexing means for rotating said turrets together with each other and for rotating at least one of said turrets independently of the other turret.

2. A tool turret assembly as defined in claim 1, wherein the number of tool holders on said one turret exceeds two and said one turret is provided with a recess disposed between two of said last mentioned tool holders.

3. A tool turret assembly as defined in claim 2, wherein the distance between said two tool holders, as considered in the circumferential direction of said one turret, is twice the average distance between the tool holders of said one turret.

4. A tool turret assembly comprising coaxial first and second turrets each having an annulus of tool holders, the tool holders of one turret including means for supporting boring tools in parallelism with the common axis of said turrets and the tool holders of the other turret including means for supporting turning tools, said turrets being movable axially relative to and together with each other; indexing means for rotating said turrets together with each other and for rotating at least one of said turrets independently of the other turret; a housing adjacent said one turret; first coupling means having portions on said housing and on said one turret for connecting said one turret to said housing in a predetermined axial position of said one turret; and second coupling means having portions provided on said turrets to connect said turrets to each other in response to axial movement of at least one of said turrets toward the other turret.

5. A tool turret assembly as defined in claim 4, wherein the portions of at least one of said coupling means comprise annuli of gear teeth.

6. A tool turret assembly comprising coaxial first and second turrets each having an annulus of tool holders, the tool holders of one turret including means for supporting boring tools in parallelism with the common axis of said turrets and the tool holders of the other turret including means for supporting turning tools; indexing means for rotating said turrets together with each other and for rotating at least one of said turrets independently of the other turret, said indexing means including a shaft coaxial with turrets and having an end portion connected for rotation with said other turret, said one turret being rotatable and movable axially of said shaft; coupling means for connecting said turrets to each other in response to axial movement of at least one of said turrets towards the other turret; and means for moving said turrets axially including fluid operated cylinder and piston means having a first piston secured to said shaft and a second piston secured to said one turret.

7. A tool turret assembly as defined in claim 6, wherein at least one of said pistons is a multi-stage piston.

8. A tool turret assembly as defined in claim 6, wherein said indexing means further comprises hydraulic motor means including rotor means secured to said shaft.

* * * * *